United States Patent [19]

Davidson

[11] Patent Number: 4,604,625
[45] Date of Patent: Aug. 5, 1986

[54] PHASE-LOCKED DIGITAL VERY HIGH FREQUENCY OMNI-RANGE (VOR) RECEIVER

[76] Inventor: Eldon F. Davidson, 240 Flower Dr., Folsom, Calif. 95630

[21] Appl. No.: 513,654

[22] Filed: Jul. 14, 1983

[51] Int. Cl.⁴ .............................................. G01S 1/44
[52] U.S. Cl. .................................................... 343/401
[58] Field of Search ............. 343/399, 400, 401, 404; 364/451

[56] References Cited

U.S. PATENT DOCUMENTS

3,988,733  10/1976  Kohler ................................ 343/402
4,074,267  2/1978   Knox .................................. 343/401

Primary Examiner—Theodore M. Blum
Attorney, Agent, or Firm—R. Gale Rhodes, Jr.

[57] ABSTRACT

A very high frequency omni-range (VOR) receiver for use in aircraft radio-navigation, which provides an indication of course deviation that is substantially immune to effects such as reflections in transmitted VOR signals, transients occurring in an aircraft's electrical system and propeller and/or rotor modulations of an incoming VOR signal and the like which are all unrelated to actual course deviation, is disclosed. Specifically, in accordance with the invention, a stream of timing pulses is generated which are accurately phase-locked to a stream of pulses corresponding to a received reference signal transmitted from a desired VOR station. Both these streams are then used to produce an "OBS" signal which is phase shifted by an amount representative of a preselected radial emitted by that station. Thereafter, the phase difference occurring between the OBS signal and a stream of pulses corresponding to a received variable signal transmitted by that same VOR station is determined and used to produce a deviation signal. The deviation signal has a value that represents any course deviation existing between the preselected radial and the present magnetic course of the aircraft with respect to the VOR station and is advantageously substantially unaffected by any effects other than actual course deviations.

18 Claims, 7 Drawing Figures

PHASE-LOCKED DIGITAL VERY HIGH FREQUENCY OMNI-RANGE (VOR) RECEIVER

BACKGROUND OF THE INVENTION

1. Field of the Invention

The invention relates to navigation receivers and, more particularly, to very high frequency omni-range (VOR) receivers commonly used for aircraft navigation.

2. Description of the Prior Art

Currently, a primary source of in-flight aircraft navigation information is provided throught the very high frequency omni-range (VOR) system. This system is typically comprised of a plurality of VOR transmitters (stations) which are widely dispersed throughout a given geographic territory. Each station within this territory continuously transmits a modulated signal on a unique pre-assigned carrier frequency with respect to all the other stations in the territory.

For navigation purposes, a VOR signal is comprised of two components: a 30 Hz reference sinusoidal signal and a 30 Hz variable sinusoidal signal. The reference signal is transmitted omni-directionally from the VOR station, such that its phase remains constant anywhere along the periphery of a circle concentrically drawn at any radial distance outwardly from the station. Hence, for any two aircraft flying different magnetic course headings toward the station, i.e. located at a different point along the periphery of the circle, each aircraft receives the same reference signal as that of the other, that is without any phase difference existing therebetween. The variable signal is transmitted such that the amount of phase difference between it and the variable signal linearly varies from 0° to 360° along the periphery of any concentric circle centered about the station. The pattern of the variable signal is such that the phase difference at any point along the circle is determined by the magnetic bearing of that point measured from the station. For example, if an aircraft were to fly a magnetic heading of 0° from a VOR station, the reference and variable signals would be totally in phase; consequently, any phase difference existing therebetween would be 0°. If, alternatively, an aircraft were to fly a 90° magnetic heading from the station, the variable signal would then lag the reference signal by 90° resulting in a 90° phase difference existing therebetween. Likewise if an aircraft were to fly a magnetic heading of 216° from the VOR station, then there would be a 216° phase difference existing between the received variable and reference signals occurring at that point (and so on). It is this varying course dependent phase difference that provides the airborne navigation information.

A VOR receiver mounted in an aircraft and tuned to the carrier of a desired VOR station determines the difference then appearing between the reference and variable signals transmitted by that VOR station and, in response thereto, provides a visual indication of the magnetic course bearing then being flown with respect to that station. To minimize reception error in differentiating between the reference and variable signals, the VOR signal is transmitted with the reference signal frequency modulating a 9960 Hz subcarrier. This subcarrier and the variable signal then each amplitude modulate the main VOR carrier by approximately 30%. In addition, aural identification of the VOR station is provided by a unique audible Morse Code signal that also modulates the main carrier.

To effectively indicate a present magnetic course, i.e. a particular VOR radial, a combined omni-bearing selector (OBS) and a left/right indicator were developed in the art for connection to the output of the VOR receiver. The OBS permits the pilot to select any magnetic course (from 0° to 360°) that he desires to fly, with respect to a particular selected VOR station, by simply turning a knob on the indicator until the selected magnetic course, i.e. the associated VOR radial, is indicated. The VOR receiver determines the actual radial that is then being flown and, in response to information regarding the selected course, generates a deviation voltage. This voltage is either zero-valued whenever the aircraft is flying on the selected course, or is positive or negative depending upon whether the aircraft is on one side of the selected course or the other. The deviation voltage is applied to an analog meter (left/right indicator) which indicates the course deviation as a left or right movement of its needle. Deviation information is presented such that whenever the OBS selector is set to the correct (non-reciprocal) magnetic course, any course deviations can be eliminated, i.e. the pilot can fly towards the correct course, by flying "into the direction" of the movement of the needle. For example, a left or right off-course indication can be corrected by turning the aircfaft to the left or the right, respectively.

Well known VOR indicators of this type also include a "To/From" indicator which specifies whether the course set through the OBS selector is in a direction that will take the pilot towards ("To") or away from ("From") the station. The "To/From" indicator is generally positioned in very close proximity to both the OBS selector and course deviation needle such that the pilot can easily perceive all three simultaneously.

In VOR receivers currently known to the art, two tuned circuits, one tuned to 9960 Hz and the other tuned to 30 Hz, are used to separate the reference and variable sinusoidal signals from the main VOR carrier. Each separated signal is then applied, through appropriate limiters and detectors, to an appropriate input of a phase detector. The phase detector produces the deviation voltage which is then applied through an amplifier to drive the left/right and "To/From" indicators.

Unfortunately, the phase detector used in presently existing VOR receivers is highly susceptible to both amplitude and phase variations occurring between its two input (reference and variable) signals. These variations are often produced by factors unrelated to actual cose deviations—such as for example reflected VOR signals, transient voltages occurring within the aircraft, weak VOR signals, or amplitude modulations imparted to the received VOR signal caused by movement of the aircraft's propeller or rotor—and thus produce erroneous course deviation indications on the left/right needle.

Specifically, reflections of VOR signals are often caused by the physical surroundings of the VOR station, and specifically by the presence of man-made objects such as buildings, power lines, bridges and/or terrain anomalies. Inasmuch as these effects are quite common and frequently occur near most VOR stations, reflected signals often reach an airborne VOR receiver at all phase angles and with an amplitude that varies as the aircraft flies along any selected radial. These reflections, in turn, cause an amplitude variation between the received reference and variable signals and also corrupt the correct phase relationship occurring therebetween.

It is well known that the physical environment around any VOR station causes the amount of received VOR signal attributable to reflections to vary from point to point along any radial emitted by that station. Moreover, the differences in the physical environments associated with any two VOR stations usually results in differing amounts of reflections for points along any particular radial of one station with respect to identically situated points associated with the other station. Therefore, the received VOR signal at most points along any radial from any VOR station usually contains a portion attributable to reflections which usually produces some error in the course deviation indication produced by the VOR receiver.

One possible solution to minimizing reflection-based errors is to store a table of correction factors within the VOR receiver. Each correction factor would be accessed by both the radial selected by the OBS selector and the radial distance from the present position of the aircraft to the VOR station and would be used to offset the left/right indication to compensate for the expected reflection occurring at that position. Unfortunately, the number of separate correction factors needed for one VOR station can be substantial. Since such information in all likelihood would be required for a plurality of stations, memory requirements to accommodate such a table can be quite significant. Hence, the resultant circuitry of the VOR receiver would likely become disadvantageously complex, bulky, and excessively expensive. Moreover, since the physical environments around VOR stations are apt to change from time to time, as a result of, for example, new structures or man-made modifications to nearby terrain, any such table would, of necessity, require updating which would, in turn, further disadvantageously escalate the cost of the VOR receiver.

An alternate solution, particularly with the advent of increasingly sophisticated micro-processors, might appear at first glance to lie in storing data relating to the physical environment of VOR station and then calculating the necessary correction factor for each point on an aircraft's path along a radial emitted from that station and using the result to appropriately correct the left/right needle indication. However, the immense complexity associated with such a calculation (both in terms of the mathematics involved as well as the substantial processing time required) effectively eliminates this solution as a viable possibility.

Consequently, presently existing VOR receivers known to the art are generally devoid of any provision to eliminate commonplace and substantial course deviation errors attributable to reflected VOR signals. Therefore, since the inception of the VOR radio navigation system, the aviation community has come to rely on the Federal Aviation Administration (FAA) to judiciously select sites for VOR stations in which the physical environment of each is least likely to produce reflections. Unfortunately, every site produces some reflections and thus necessitates substantial expenditures of time—including flight checks, and money—in assessing its suitability for a VOR station. As an expedient in selecting sites, the FAA has developed standards for maximum amounts of course deviation error which under various categories of VOR use can be safely tolerated for any VOR station. Hence, every pilot learns to disadvantageously accept a certain amount of error in radio navigating with regard to any VOR radial.

A further deficiency of presently existing VOR receivers involves the so-called "cone of confusion." In particular, whenever an aircraft is very close to a VOR station, the "To/From" indicator fluctuates wildly and the left/right needle rapidly moves back and forth from one extreme point of its travel to the other. The region above a VOR station in which these indications occur generally resembles an inverted cone with the VOR station at its apex. With presently existing VOR receivers, the sides of the cone are inclined with respect to its vertical axis at angles of approximately 30°. The width of the cone varies with altitude and normally extends for several miles at an altitude of several thousand feet above any VOR station. While these indications are used by the pilot as an "over-station" indication, these indcations, due to the varying altitude dependent width of the cone, disadvantageously provide no accurate indication of the exact point in time when the aircraft is directly over the VOR station.

SUMMARY OF THE INVENTION

Accordingly, an object of the present invention is to provide an extremely accurate VOR receiver for use in aircraft radio navigation.

A particular object is to provide such a receiver which generates course deviation indications for any VOR station and any VOR radial that are substantially unaffected by all the factors other than actual course deviations.

A more particular object of this invention is to provide such a receiver having a response which is substantially immune to any reflected VOR signals.

Another more particular object is to provide such a response which is substantially unaffected by any other factors, such as transient voltages and modulations caused by a propeller or rotor, which are all unrelated to actual course deviations.

Another particular object is to generate an accurate indication of the point in time whenever the aircraft is directly over any VOR station, thereby minimizing the size of the "cone of confusion."

A further object is to provide such a receiver which is simple, easy to construct, and extremely inexpensive.

Another object is to substantially reduce the time, effort and money required in assessing the suitability of a site for a VOR station.

Another more particular object is to significantly minimize the need to select VOR station sites based upon the amount of reflections caused by their physical environment.

These and other objects are accomplished in accordance with the present invention by first generating a stream of timing pulses which are accurately phase-locked to a stream of pulses corresponding to the received reference signal transmitted by a desired VOR station, second producing in response to both pulse streams a signal (henceforth referred to as the "OBS" signal) which is phase shifted by an amount representative of a selected radial emitted by that station, and third determining any phase difference between the "OBS" signal and the stream of pulses corresponding to the received variable signal transmitted by the same station. This phase difference is used to produce a deviation signal having a value that represents any course deviations existing between the selected radial and the present magnetic course of the aircraft with respect to the VOR station. Advantageously, the value of the deviation signal is only affected by course deviations and is substantially immune to any reflections, and other effects, such as transients within the aircraft and/or rotor and propeller modulation of an incoming VOR signal, which are all unrelated to actual course deviations.

Specifically, in accordance with a preferred embodiment disclosed herein, the reference and variable 30 Hz sinusoidal signals are both extracted from a main VOR carrier and are appropriately limited to yield two pulse streams: one corresponding to the reference signal and the other corresponding to the variable signal. The 30 Hz reference pulse stream is applied as one input to a phase comparator within a phase locked loop. A voltage controlled oscillator, which also forms part of this loop, is set to run at exactly 360 times the frequency of the reference signal, i.e. nominally 10.8 kHz. Consequently, each cycle produced by the phase lock loop corresponds to 1° of the reference sinusoidal signal. This provides an extremely accurate timing signal which is phase-locked to the reference signal. Digital information, representing the desired magnetic course (radial) is fed to three counters which decrement this information to zero starting at the occurrence of a pulse on the reference pulse stream and continuing at a rate determined by the timing signal. When the count reaches zero, a pulse (henceforth referred to as the "OBS" pulse) is produced. The phase difference (in degrees) between this pulse and the most recently occurring reference pulse is indicative of the selected course. The phase difference between the OBS signal and the variable pulse stream is then determined by a phase (coincidence) detector, which produces a deviation signal in response thereto. This deviation signal is appropriately integrated and amplified, and thereafter applied to drive an appropriate indicator which has been properly labelled to show left/right course deviations.

Additional circuitry is included to numerically display the actual radial that is presently being flown and also to provide an accurate visual "To/From" indication. These circuits use the timing signal to accurately determine various phase relationships between the reference pulse stream, the variable pulse stream and/or the OBS signal.

Since all the indications (course deviation, actual course, and "To/From") produced by a VOR receiver embodying the teachings of the present invention are substantially and essentially determined by phase information alone, such a receiver is substantially immune and its indications are substantially unaffected by any amplitude variations, illustratively caused by reflections, transients and the like, in an incoming VOR signal.

In accordance with a feature of the present invention, the accuracy of a VOR receiver incorporating the teachings of the present invention can be easily and inexpensively increased by one or more orders of magnitude. This is achieved by increasing the free running frequency of the voltage controlled oscillator existing within the phase locked loop by the same amount, and adding an additional counting stage(s) to each of the various counters used in accordance with the present invention.

BRIEF DESCRIPTION OF THE DRAWING

The invention may be clearly understood from a consideration of the following detailed description and accompanying drawing in which:

FIGS. 23 and are graphical representations of the effect on the variable VOR signal of reflections of 0° and 180°, and ±90°, respectively;

To facilitate easy understanding, identical reference numerals are used to denote elements which are common to various figures.

DETAILED DESCRIPTION

Any very high frequency omni-range (VOR) station transmits a main carrier onto which two signals, the so-called reference and variable signals, are modulated for use in radio-navigation. The reference signal is a 30 Hz sine wave which is radiated omni-directionally from the station such that its phase is constant anywhere around the station. By contrast, the variable signal is also a 30 Hz sine wave but is transmitted in such a fashion that its phase value linearly varies around the station, i.e. aircraft located at different magnetic bearings (radials) from the station will receive the variable signal with different phase relationships with respect to the received 30 Hz reference signal. It is this linearly changing phase information between the reference and variable signals that provides airborne VOR radio-navigation information.

In order for a VOR receiver to effectively differentiate and separate the 30 Hz reference and variable signals from the main carrier, a different modulation technique is commonly used with respect to each signal. Specifically, the reference signal is frequency modulated (FM) onto a 9960 Hz subcarrier which, in turn, amplitude modulates (AM) the main VOR carrier by a pre-set amount, typically 30%. The 30 Hz variable signal is used to directly amplitude modulate the main VOR carrier, also by typically 30%. As will be discussed in greater detail shortly, the phase and/or amplitude of the reference and/or variable signals are usually corrupted by variations unrelated to actual course deviations and illustratively attributable to reflections of the transmitted VOR signal, transients occurring in the aircraft's electrical system, propeller and/or rotor modulation of an incoming VOR signal and the like.

Figure 1:
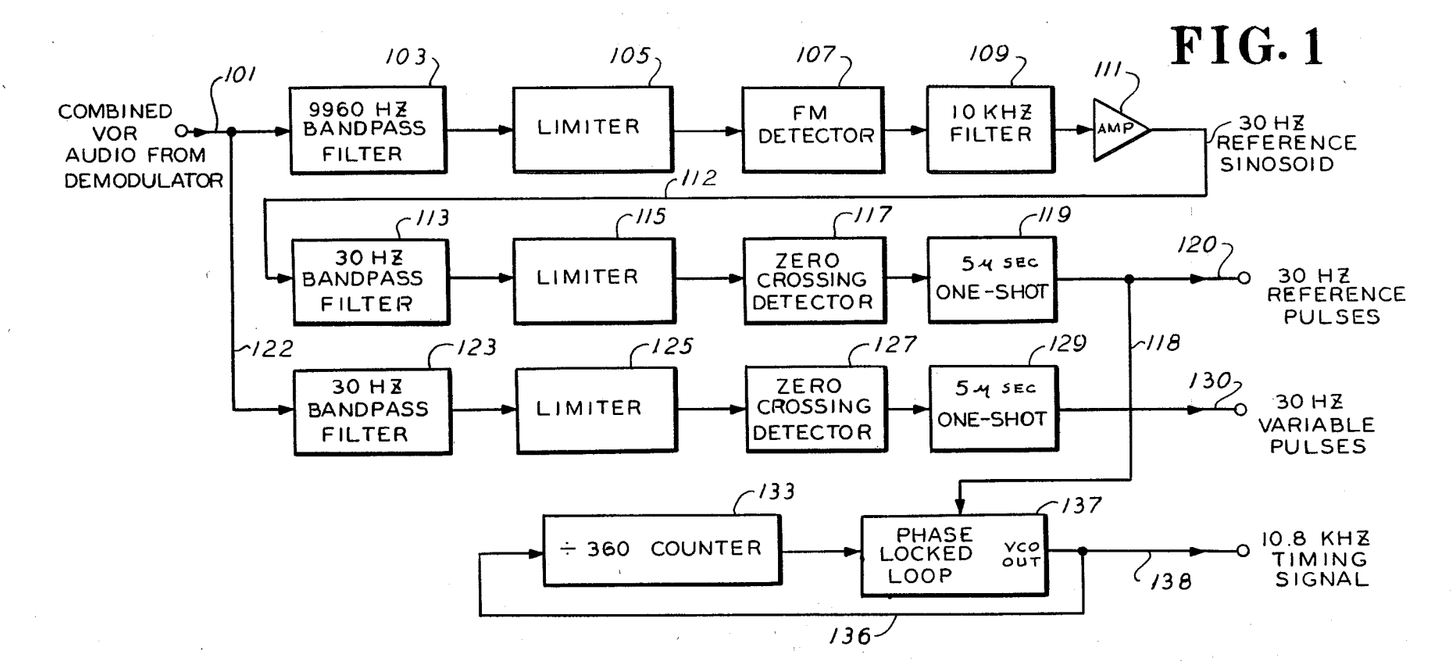
FIG. 1 is a block diagram of a portion of the circuitry of a very high frequency (VOR) omni-range receiver embodying the principles of applicant's invention and, more particularly, showing the timing signal generation circuitry used therein.

Within most VOR receivers known to the art, the incoming VOR signal is first demodulated to remove the main carrier and leave the combined reference and variable signals in the audio frequency range. Thereafter, as shown in FIG. 1, the combined VOR modulating audio signal is applied over leads 101 and 122 to two tuned circuits, bandpass filter 103 tuned to 9960 Hz and bandpass filter 123 tuned to 30 Hz. These filters separate the desired reference and variable 30 Hz sine waves from the combined VOR audio signal. The output signal produced by bandpass filter 103 is applied to limiter 105 which, in turn, removes all unwanted amplitude variations caused by, for example, reflections occurring in this signal. Thereafter, the output of limiter 105 is applied through FM detector 107, 10 kHz filter 109 and amplifier 111 which together extract and amplify the 30 Hz reference sine wave from the 9960 Hz FM subcarrier. The resultant 30 Hz reference sine wave is then applied through 30 Hz bandpass filter 113 to remove any extraneous signals appearing in the output of amplifier 111.

In most VOR receivers known to the art, the separated 30 Hz reference and variable signals (occurring at the outputs of bandpass filters 113 and 123) are then amplified by highly linear amplifiers (not shown) to a sufficient level to drive an appropriate indicator which shows course deviation. While any amplitude variations occurring in the 30 Hz reference signal have been removed by limiter 105, unwanted amplitude variations, caused by for example reflections, will exist in the 30 Hz variable signal appearing at the output of bandpass filter 123. These variations, when amplified, disadvantageously cause erroneous deviation indications.

Figure 2:
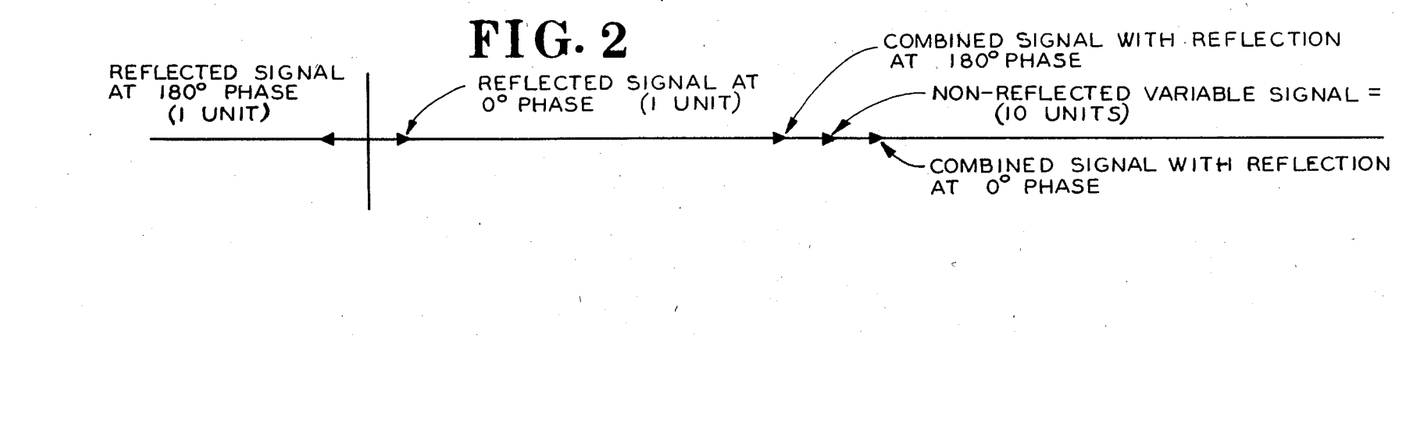
Figure 3:
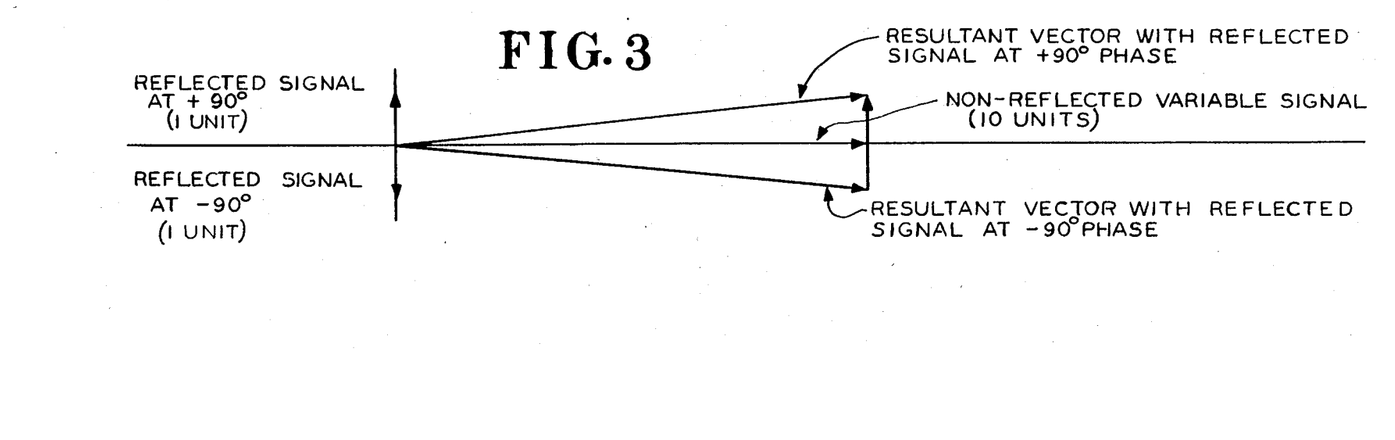

FIGS. 2 and 3 graphically depict two illustrative examples which show the adverse effect of VOR signal reflection on the variable signal appearing in a typical VOR receiver known to the art. While reflected VOR signals can reach a VOR receiver at all phase angles and at a variety of amplitudes as an aircraft flies along the VOR radial, two basic cases involve the reflected signal being (a) either in-phase or 180° out-of-phase (as shown in FIG. 2), or (b) ±90° out-of-phase (as shown in FIG. 3) with respect to the non-reflected variable signal. For purposes of these figures, the non-reflected variable signal is assumed to have a signal level of 10 units with the reflected signal being −10 db below the variable signal, which equates to a signal level of one unit. If, as shown in FIG. 2, the reflected signal is either 0° or 180° out-of-phase with respect to the non-reflected variable signal—the worst case error condition for a VOR receiver—then through vector addition the actual variable signal present at the output of bandpass filter 123 possesses a sigal level of either 11 or 9 units, respectively, (instead of 10) at a phase angle of 0°. Consequently, this one unit increase or decrease in the level of the variable signal erroneously alters the indicated course deviation. Alternatively, if, as shown in FIG. 3, the reflected signal is ±90° out-of-phase with respect to the non-reflected variable signal, then through vector addition the actual variable signal appearing at the output of bandpass filter 123 has a small erroneous signal level component (approximately 0.05 unit) and a completely erroneous phase component (approximately 6°). Consequently, these components also erroneously alter the indicated course deviation. In practice, flight checks have confirmed that erroneously indicated course deviations caused by reflected VOR signals can amount to as much as 6°-10°, if not more in some cases.

In accordance with the teachings of the present invention, these erroneous course deviation indication conditions are eliminated by first generating—in a manner described below—an accurate high frequency timing (clock) signal which is phase locked to the reference sinusoidal signal, then second using that timing signal in conjunction with pulse trains representing the reference and variable sinusoidal signals to accurately determine various phase relationships existing between these signals, and third displaying highly accurate course deviation and other navigation information in response to these phase differences.

Specifically, the 30 Hz reference sine wave appearing at the output of bandpass filter 113 is applied through limiter 115 and zero crossing detector 117, which together convert the reference sine wave into a substantially square wave having transitions occurring at the zero (cross-over) points in the sine wave. The square wave is then applied to one-shot (monostable multivibrator) 119 which produces a pulse on lead 120 having an illustrative and approximate width of 5 useconds whenever, for example, a positive-going level change occurs in the square wave. The 30 Hz variable sine wave is applied through similar circuits, i.e. 30 Hz bandpass filter 123, limiter 125, zero crossing detector 127 and one-shot (monostable multivibrator) 129 to produce similar 5 useconds pulses on lead 130. Advantageously, these pulses are substantially unaffected by any variations occurring in the 30 Hz variable signal. Consequently, both the 30 Hz variable pulse stream appearing on lead 130 and the 30 Hz reference pulse stream appearing on lead 120 are both substantially unaffected by amplitude variations caused in the variable signal, the reference signal, or both.

Course deviations are determined, in accordance with the present invention, by accurately ascertaining the phase difference between the 30 Hz variable and 30 Hz reference pulse streams. To accomplish this, the reference pulse stream is applied over lead 118 to one input of a phase comparator (not shown) existing witin phase-locked loop 137, which in turn generates a stream of timing (clock) pulses on lead 138 which are substantially phase-locked to the reference pulses. For an accuracy of 1° in indicated course deviation, the voltage controlled oscillator (VCO) is set to run at exactly 360 times the frequency of the reference pulses appearing on lead 118. This is readily achieved by applying the VCO output of the phase lock loop through ÷360 counter 133 to the other input of the phase comparator contained within the phase-locked loop. With phase lock and with a frequency of 360 times that of both the reference and variable signals, then advantageously the exact count of the number of timing pulses occurring between a variable pulse on lead 130 and a reference pulse on lead 120 exactly equals the phase difference in degrees between the variable and reference VOR signals.

Since the reference and variable signals generated by a VOR station may and often do deviate from exactly 30 Hz, a phase-locked loop, particularly CMOS type 4046 or equivalent, is preferably used to generate the timing pulses. For example, a number of older VOR stations rely on the 60 Hz AC power line frequency to establish the 30 Hz reference and variable sine waves. Since frequency variations do occur in the AC power frequency, the frequency of the reference and variable sine waves may vary by as much as 1-2 Hz which results in a 1°-2° error. The same variation often occurs whenever the VOR station is being run on a souce of emergency power. Hence, if a phase-locked loop is used, as shown in FIG. 1, then its output signal always tracks the variation in frequency of the reference sine wave and remains at an exact frequency that is 360 times faster than that of the reference signal. For purposes of the following discussion, the frequency of the variable and reference sine waves will be assumed to be exactly 30 Hz and thus the output frequency of the phase-locked loop will be 10.8 kHz.

Figure 4:
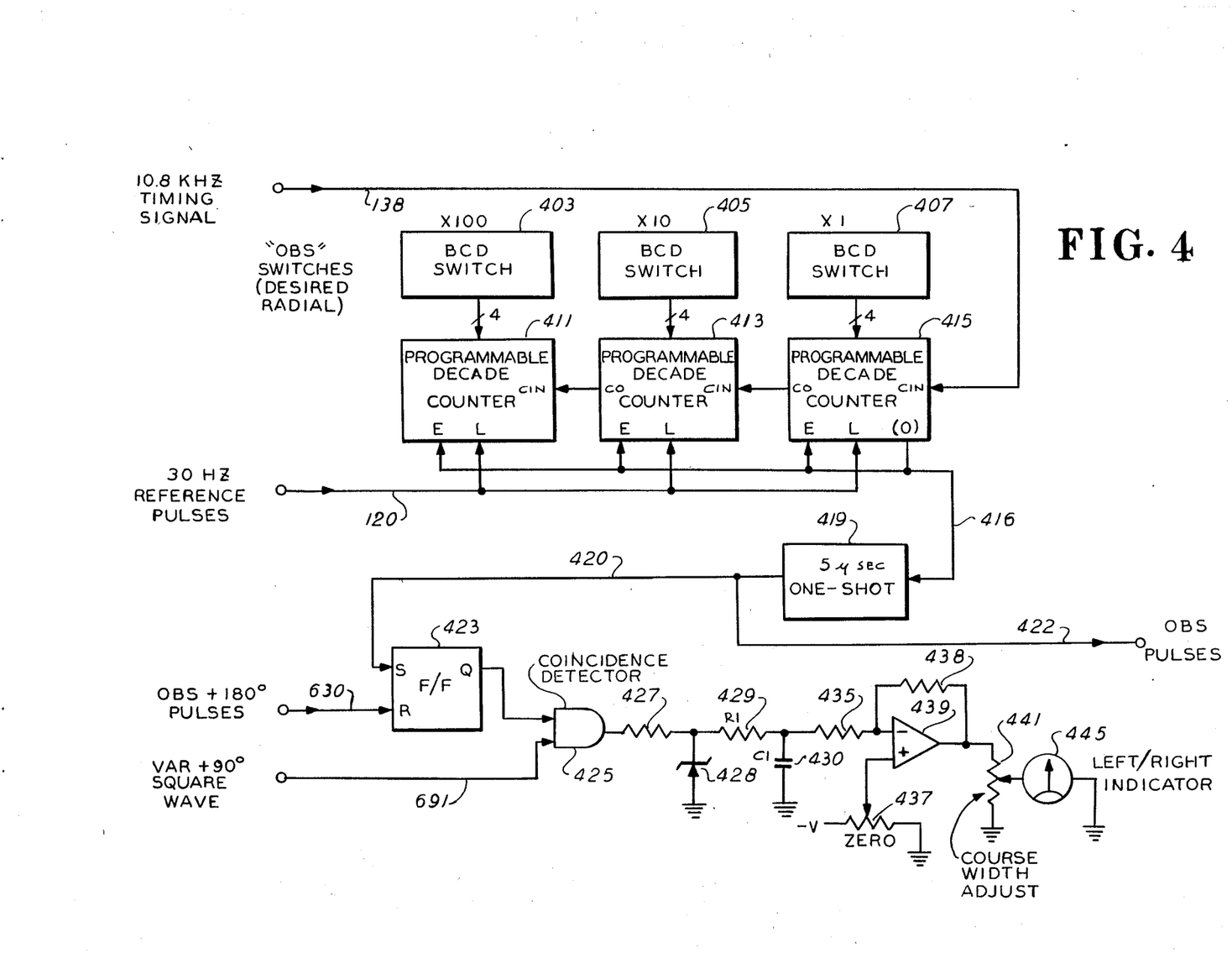
FIG. 4 is a block diagram of the circuitry, used in conjunction with that shown in FIGS. 1 and 6, for displaying course deviation indications in accordance with the teachings of the present invention.

A block diagram of the circuitry, used in conjunction with that shown in FIG. 1, for displaying course deviation information is shown in FIG. 4. Specifically, a desired magnetic radial emitted by a VOR station is selected by a pilot by appropriately settng BCD (binary coded decimal) switches (illustratively thumbwheels) 403, 405 and 407. These switches are referred to as the "OBS" (omni-bearing) selector switches. The 4-bit BCD digital outputs produced by each thumbwheel are fed in parallel to the parallel inputs of an associated programmable decade counter, i.e. counters 411, 413 and 415, which are illustratively CMOS type 4522 programmable counters. Each one of the 30 Hz reference pulses appearing on lead 120 causes these digital outputs to be loaded into the three decade counters. Thereafter, these counters decrement their contents by one at the occurrence of each pulse in the 10.8 kHz timing signal appearing on lead 138. Whenever the contents of these counters reach zero, the "(0)" output of counter 415 changes state, i.e. from low to high. By virtue of the connection of the (0) output to the enable ("E") input of all the counters, further decrementation is prevented. The positive going output provided by the (0) output is applied as input to one-shot (mono-stable multivibrator) 419 which, in response thereto, generates a positive pulse having a width of preferably 5 useconds. This pulse is applied to lead 420 and also to lead 422 as the "OBS" pulses. The phase delay between the occurrence of a 30 Hz reference pulse and the next successive "OBS" pulse is equal to the selected radial in degrees set on the OBS switches.

The 5 useconds pulse appearing on lead 420 is applied to the set (S) input of flip-flop 423 which, in turn, sets its Q output to a high state. This output is applied to one input to AND gate 425 which functions as a coincidence detector and is enabled thereby. Flip-flop 423 remains in a set condition (Q output high) until an "OBS+180°" pulse occurs on lead 630. This pulse is discussed later in conjunction with FIG. 6. Coincidence detector (AND gate) 425 determines the coincidence between the signal produced at the Q output of flip-flop 423 and the "VAR+90°" square wave appearing on lead 691 (and discussed in conjunction with FIG. 6 below). The output of this detector—the deviation voltage—varies in duty cycle from 0 to 50% as discussed in greater detail below.

Advantageously, coincidence detector 425 does not respond to any amplitude variations occurring in the 30 Hz variable signal. Consequently, this substantially eliminates all adverse effects on course deviation indications produced by reflections, transients in the aircraft's electrical system, propeller and/or rotor modulations and other similar effects. Specifically, reduction of erroneous course deviation information is greatest whenever the reflected VOR signal is either in-phase or 180° out-of-phase with respect to the non-reflected VOR signal. At these phase relationships, any amplitude variations in the 30 Hz variable reference signal merely change the amplitude of the 30 Hz variable signal detected by the VOR receiver (see FIG. 2) and do not impart any phase difference to it. Since the time relationship (phase difference) between the main and reference 30 Hz pulses does not change, the output of coincidence detector 425 is unaffected by these reflections.

The variable duty cycle output produced by coincidence detector 425 is limited through resistor 427 and zener diode 428 to approximately 4 volts (the zener voltage). The resulting limited voltage is then integrated by resistor 429 and capacitor 430, by appropriate selection of the values $R_1$ and $C_1$ of the resistor and capacitor respectively, into an approximately DC shaped level. This level is amplified by amplifier 439 into a level sufficient to drive left/right (galvanometer) indicator 445. The values of resistor 435 and 438 are chosen to set the gain of amplifier 439 to a desired value. Potentiometer 437 is adjusted, preferably during calibration of the VOR receiver, to appropriately zero the output of amplifier 439 when the VOR is receiving a VOR navigation signal which is the same as the OBS switches are set to. This adjustment is normally made with the OBS switches set to zero degrees. In addition, this adjustment also compensates for any offsets in amplifier 439. The setting of "course width" potentiometer 441 determines the sensitivity of left/right indicator 445 to course deviations.

Figure 7:
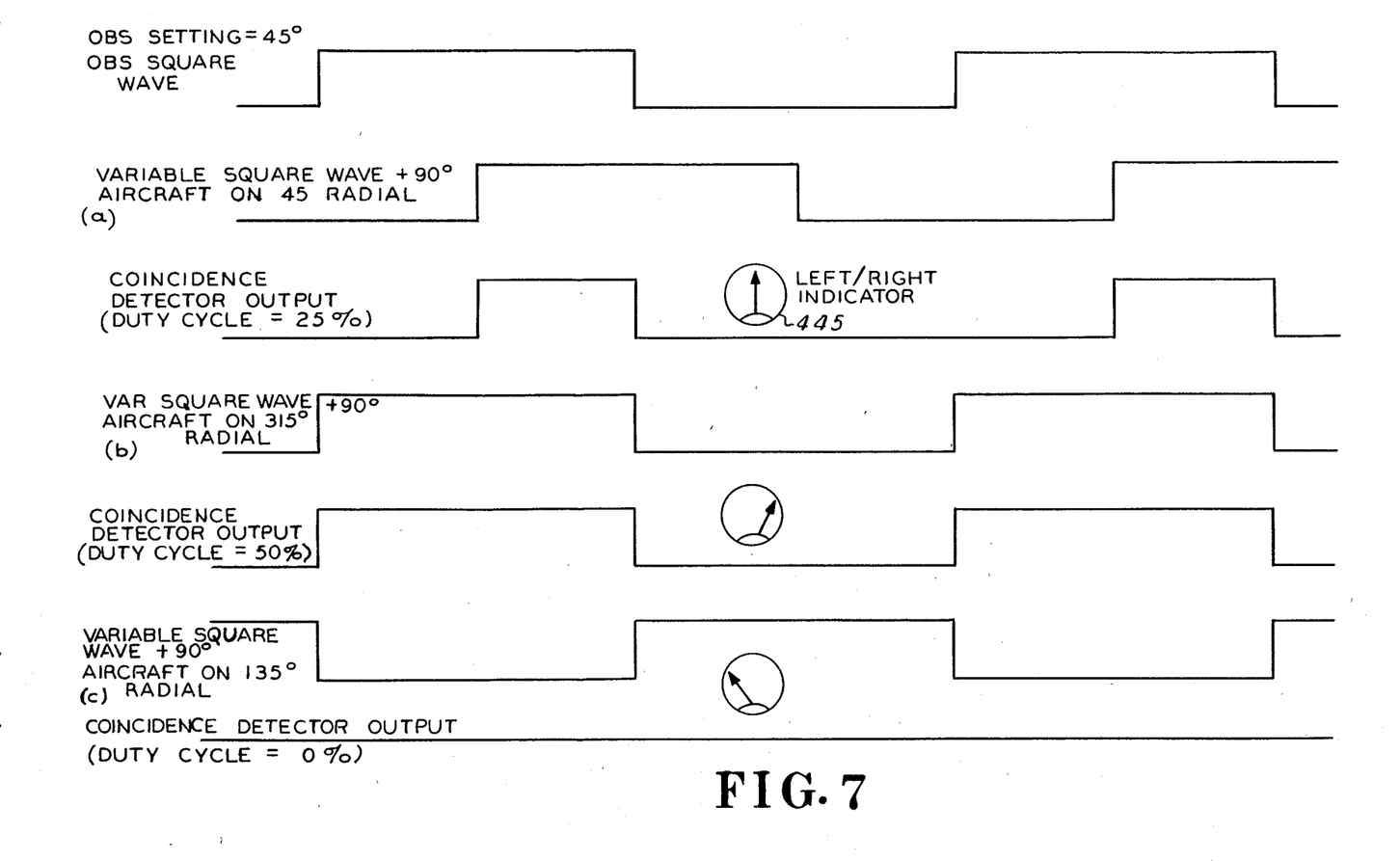
FIG. 7 is a sketch of various waveforms taken at selected points in the circuitry shown in FIG. 4.

Illustrative waveforms, depicting the operation of the circuitry shown in FIG. 4, are shown in FIG. 7. With the OBS switches for a selected radial of 45° and with the aircraft flying along this radial, the output of coincidence detector 425 is as shown in waveforms (a), a square wave having an approximately 25% duty cycle. This produces a zero course deviation indication (i.e. needle is at the middle of its total travel) on left/right indicator 445 because at this point the integrated dc level of this voltage produced by the coincidence detector equals the voltage from the zero potentiometer connected to the + input amplifier 439. Alternatively, if the selected radial is to the right of the aircraft, as in waveforms (b) where the aircraft is flying along a 315° radial from the VOR station and the OBS selector is set for the 45° radial, then the output of the coincidence detector is a square wave with a 50% duty cycle. When integrated, the wave form possesses approximately twice the amplitude of that shown for the integrated detector output for waveforms (a). Consequently, the left/right indicator produces a maximum indication to the right signifying that the pilot should sharply fly to the right in order to intercept the selected 45° radial. Lastly, if the selected radial is to the left of the aircraft, as in waveforms (c) where the aircraft is flying along a 135° radial from the station with a selected radial of 45°, then the output of the coincidence detector is zero. This causes a voltage of opposite polarity to be applied to left/right indicator 445 which, in turn, produces a maximum indication to the left thereby signifying that the pilot should sharply fly to the left to intercept the selected 45° radial.

Empirical tests performed on a VOR receiver embodying the teachings of the present invention have confirmed its substantial immunity to reflected signals. Specifically, a simulated reflected VOR signal having a phase difference of either +90° or −90° was injected along with a simulated non-reflected VOR signal into the receiver. With the reflected signal set to a signal level of −30 db below that of the non-reflected signal, the left/right needle indicated a maximum course deviation of ±0.5° error as the phase of the reflected signal was changed from +90° to −90°. This error decreased as the level of the reflected signal was reduced. With the level of the reflected signal set at −40 db down from the non-reflected signal, zero error was indicated on the course deviation indicator. Zero error was also advantageously indicated whenever the phase difference was set to either 0° or 180°, with the level of the reflected sgnal set to either 30 or 40 db down from that of the non-reflected signal.

Figure 5:
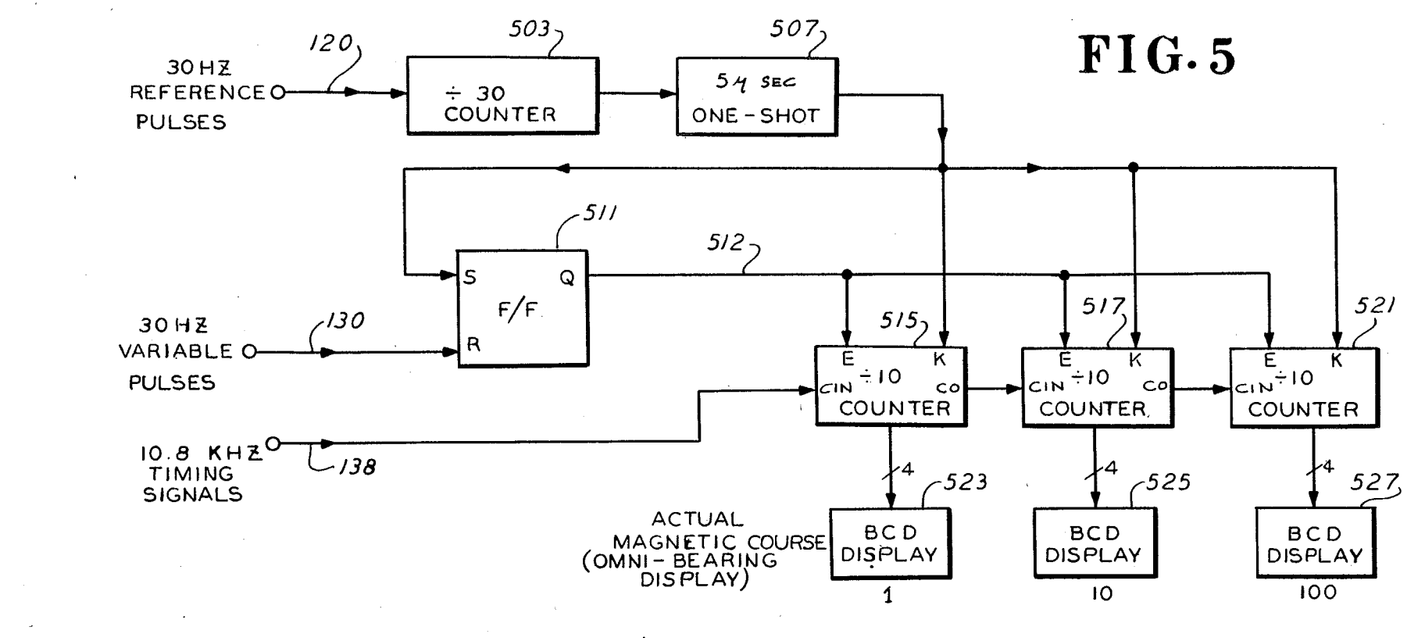
FIG. 5 is block diagram of the circuitry, sed in conjunction with the receiver shown in FIG. 1, for displaying the present course (omni-bearing) information in accordance with the teachings of the present invention.

A block diagram of the circuitry, used in conjunction with that shown in FIG. 1, for indicating the present radial ("omni-bearing") being received from a selected VOR station is shown in FIG. 5. Each of the 30 Hz reference pulses is applied over lead 120 to ÷30 counter 503 which, with a 30 Hz input frequency, produces an output pulse once per second, for updating the BCD omni-bearing display. Each pulse produced by counter 503 is, in turn, applied to the input of one-shot (monostable multivibrator) 507 which, in response thereto, produces a pulse of approximately and preferably 5 useconds in width.

The 5 useconds pulse is applied to he set (H) input of flip-flop 511 which, in turn, changes the state of its Q output to a high level. This 5 useconds pulse is also applied to the reset inputs of ÷10 counters 515, 517 and 521 to simultaneously reset the contents of all these counters to zero. The high level on the Q output of flip-flop 511 is applied to the enable ("E") inputs of all these counters to permit them to begin counting up from zero. Thereafter, each pulse comprising the 10.8 kHz timing signal, appearing on lead 138, causes these counters to increment their contents by 1. This incrementation continues until the next successive 30 Hz variable pulse appears on lead 130. This variable pulse is applied to the reset ("R") input of flip-flop 511 which, in turn, causes the Q output of this flip-flop to return to a low state. This disables the three counters thereby preventing any further counting until one-shot 507 produces the next 5 useconds pulse at which point this cycle repeats. At the end of each counting interval, counters 515, 517 and 521 contain a BCD value which equals the actual phase difference (in degrees) between the incoming 30 Hz reference and variable signals transmitted by the selected VOR station. This information corresponds to the actual radial ("omni-bearing") that is presently being received from the VOR station. This information is then applied in parallel fashion to three BCD displays 523, 525 and 527 which simultaneously and visibly display the omni-bearing information for the pilot's use. With three counters and displays and with the frequency of the timing signal set to 360 times the reference (and variable) sine waves, an accuracy of 1° is provided in the displayed omni-bearing information.

Figure 6:
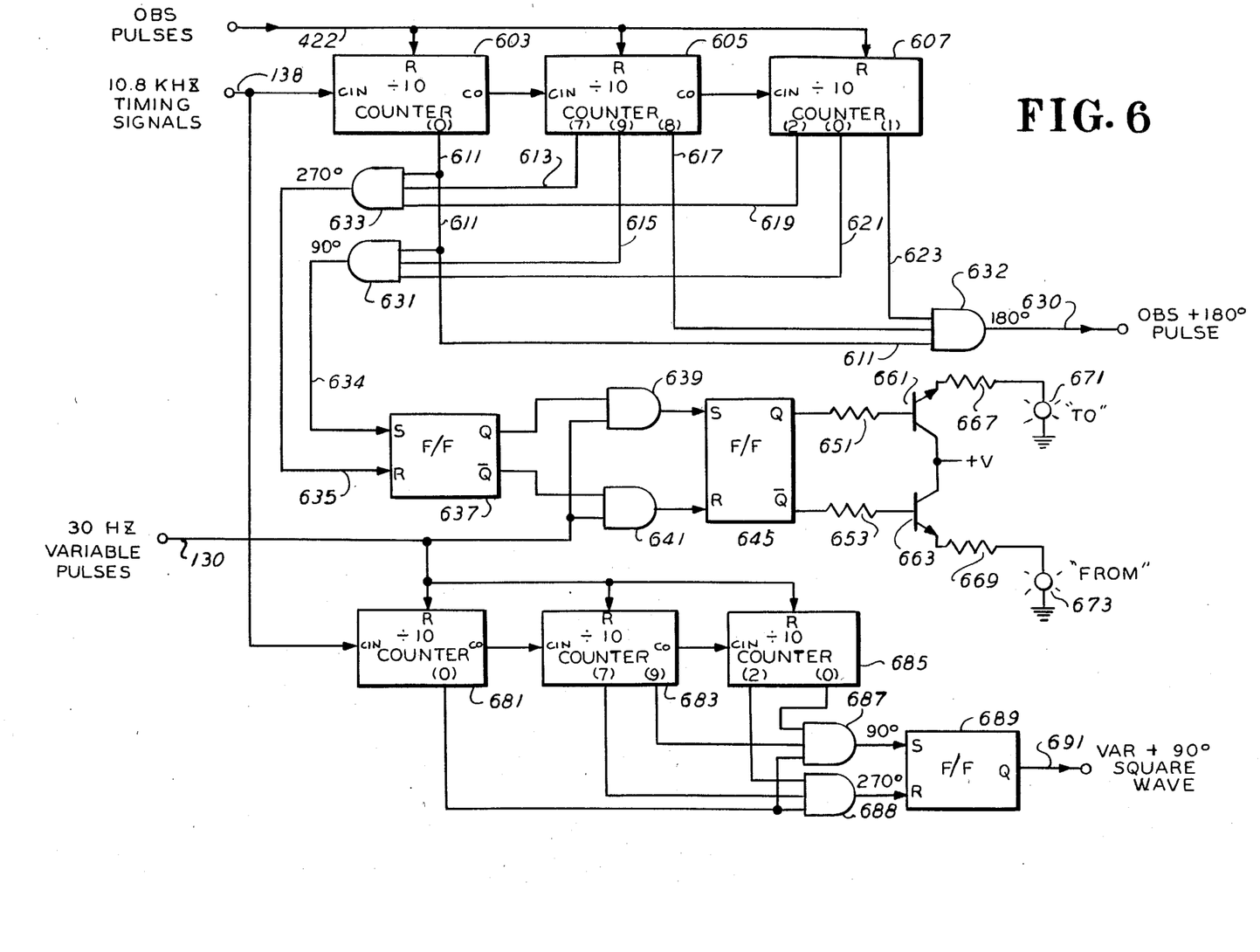
FIG. 6 is a block diagram of the circuitry, used in conjunction with that shown in FIGS. 1 and 4, for displaying "To/From" indications in accordance with the teachings of the present invention.

Lastly, a block diagram of the circuit, used in conjunction with the circuitry shown in FIGS. 1 and 4 for providing a visual "To/From" indication is shown in FIG. 6. Each "OBS pulse" produced by the circuitry shown in FIG. 4 and applied to lead 422, is routed to the reset input of each of three ÷10 BCD counters, i.e. counters 603, 605 and 607 which are all preferably CMOS type 4017 counters. At the occurrence of each pulse, the contents of all of these counters are simultaneously reset to zero. Thereafter, each successively occurring pulse comprising the 10.8 kHz timing signal, appearing on lead 138, causes these BCD counters to increment the total count (appearing in all three) by one. Each BCD counter contains a decade decoder which provides separate outputs for each numerical value, 0 through 9, that can be stored in (the counter. Three AND gates, specifically AND gates 631, 632 and 633, are connected to respective outputs from each of the three counters in order to provide separate pulses whenever the total count reaches 90, 180 and 270 respectively. The 90° pulse produced by AND gate 631 is applied to the set input of flip-flop 637 thereby causing its Q output to assume a high level. If the aircraft is flying on any radial between 90° and 270° removed from the selected radial, then a 30 Hz variable pulse appears on line 130 before the appearance of a 270° pulse on lead 635. Consequently, the 30 Hz variable pulse enables AND gates 639 and 641 which route the high and low levels present on the Q and $\overline{Q}$ outputs of flip-flop 637 to the set (S) and reset (R) inputs of flip-flop 645. This causes flip-flop 645 to set its Q output to a high level which, in turn, through resistor 651 switches transistor 661 on, thereby energizing only "To" indicator 671. Alternatively, whenever the aircraft is flying any radial within ±90° of the selected radial, then flip-flop 637 remains in a reset condition (reset by the most recent 270° pulse produced by AND gate 633), whenever a 30 Hz variable pulse appears on line 130. Consequently, this vaiable pulse, via AND gates 639 and 641, causes flip-flop 645 to be reset wherein its $\overline{Q}$ output assumes a high level state and its Q output assumes a low level state. Consequently, this high level $\overline{Q}$ output applied through resistor 653 switches transistor 663 on which, in turn, only energizes "From" indicator 673. Resistors 667 and 669 are appropriately chosen to limit the current through the "To" and "From" indicators to a safe value. The remainder of the circuitry shown at the bottom of FIG. 6 and comprised of three ÷10 counters 681, 683 and 685, AND gates 687 and 688 and flip-flop 689 generates the "VAR+90° square wave," which is applied via lead 691 to the circuitry shown in FIG. 4. This square wave represents a squared version of the 30 Hz variable sine wave which has been phase delayed by 90°. This square wave form is generated in a manner nearly identical to that in which the "To/From" selection signal (Q output of flip-flop 637) is generated with the sole exception being that the three ÷10 counters 681, 683 and 685 are all simultaneously reset to zero in response to the occurrence of each 30 Hz variable pulse appearing on lead 130.

Of course, it will be appreciated by those skilled in the art that the accuracy of a VOR receiver embodying the teachings of the present invention can be easily and inexpensively increased by a factor of 10 (to 0.1°). This is accomplished by increasing the frequency of the phase-locked timing signal to 3600 times the reference and variable frequencies, i.e. nominally 108 kHz. To do this, an additional ÷10 counting stage is added to the ÷360 counter connected to the phaselocked loop (see FIG. 1). Also an additional decade (BCD) counting stage is added to each counter, and an additional OBS BCD switch and a BCD "omni-bearing" display are also added to the circuitry shown in the figures.

Furthermore, the OBS inputs to the VOR receiver need not be generated only by manual OBS switches but instead can be remotely produced by any digital device, such as a navigation computer, telemetry circuit or any other external digital circuit. Likewise, the digital omni-bearing information generated by the VOR receiver is not limited to being applied to visual displays, but in fact can be used in digital form as input to any external digital device, such as a navigation computer, telemetry equipment or other digital circuit. Also, the left/right course deviation signal, as well as the "To/From" signals can also be utilized in a variety of forms different from that shown above in order to appropriately interface the VOR receiver to various external digital devices. Consequently, the ease with which both remote navigation information can be read into and highly accurate navigation information can be obtained from a VOR receiver embodying the present invention makes this receiver particularly suitable for applications involving missiles and/or remotely piloted aircraft.

It will be understood by those skilled in the art that many modifications and variations of the present invention may be made without departing from the spirit and the scope thereof.

What is claimed is:

1. In a very high frequency omni-range (VOR) receiver of the type wherein an incoming VOR signal is comprised of both a reference signal and a variable signal, circuitry for producing navigation information in response to said reference and variable signals comprising:
    means for generating a stream of timing pulses which are in a substantially phase-locked relationship to a stream of pulses corresponding to said reference signal;
    means for producing, in response to said timing pulse stream and to said reference signal pulse stream, a stream of OBS pulses which are phase-shifted by an amount representative of a preselected radial emitted by a predetermined VOR station; and
    means, operative in response to said timing pulse stream, said OBS pulse stream, and a stream of pulses corresponding to said variable signal, for determining any phase difference existing between said OBS pulse stream and said variable signal pulse stream and, in response thereto, producing a voltage indicative of course deviation between an actual course and said pre-selected radial.

2. The invention in claim 1 wherein said generating means is comprised of means operative, in response to said timing pulses and said reference signal pulse stream, for maintaining the frequency of said timing pulse stream at substantially a pre-set multiple of the frequency of said reference signal pulse stream.

3. The invention in claim 2 wherein said circuitry is further comprised of:
    means, responsive to said timing pulse stream, said OBS pulse stream and to said variable signal pulse stream, for producing at least one To/From signal indicative of whether the actual course is in a direction towards or away from the predetermined VOR station.

4. The invention in claim 3 wherein said circuitry is further comprised of:
    means, responsive to said timing pulse stream, said reference signal pulse stream and said variable signal pulse stream, for ascertaining any phase delay between the occurrence of both a pulse in said reference signal pulse stream and a successive pulse in said variable signal pulse stream and, in response thereto, providing a signal indicative of the actual course.

5. The invention in claim 4 wherein said producing means is comprised of:
    means for providing digital information representative of said pre-selected radial;
    means for counting said digital information to a predetermined value in response to said timing pulses and for producing a pulse in said OBS pulse stream whenever said count reaches a predetermined value; and
    means for initiating said counting at the occurrence of a pulse in said reference signal pulse stream.

6. The invention in claim 5 wherein said ascertaining and providing means is further comprised of:
    means responsive to said timing pulse stream, said variable signal pulse stream and said reference signal pulse stream for counting the timing pulses occurring between the occurrence of a pulse in said variable signal pulse stream and a successive pulse in said reference signal pulse stream; and
    means responsive to said count for producing a signal having a value indicative of the actual course.

7. The invention in claim 6 wherein the To/From signals producing means is comprised of:
    means responsive to said OBS signal and said timing pulses for counting the number of timing pulses occurring between the successive pulses in said OBS signal;
    means, responsive to at least one preselected value of the counted number, for generating an output associated therewith; and
    means responsive to said output for producing said To/From signal.

8. In a very high frequency omni-range (VOR) receiver of the type wherein an incoming VOR signal is comprised of both a reference signal and a variable signal, circuitry for producing navigation information in response to said reference and variable signals comprising:
    means for generating a stream of timing pulses which are in a substantially phase-locked relationship to a stream of pulses corresponding to said reference signal and are maintained at a frequency which is substantially at a pre-set multiple of the frequency of said reference signal pulse stream;
    means for providing digital information representative of a pre-selected radial;
    means for counting said digital information to a predetermined value in response to said timing pulses and for producing a pulse in an OBS pulse stream whenever said count reaches said predetermined value;
    means for initating said counting at the occurrence of a pulse in said reference signal pulse stream;
    means, operative in response to said timing pulse stream, said OBS pulse stream and a stream of pulses corresponding to said variable signal, for determining any phase difference existing between said OBS pulse stream and said variable signal pulse stream; and
    means, responsive to said phase difference for producing a voltage indicative of course deviation between an actual course and said preselected radial.

9. The invention in claim 8 wherein said circuitry is further comprised of:
    means, responsive to said timing pulse stream, said OBS pulse stream and to said variable signal pulse stream, for producing at least one To/From signal indicative of whether the actual course is in a direction towards or away from the predetermined VOR station.

10. The invention in claim 9 wherein said circuitry is further comprised of:
    means, responsive to said timing pulse stream, said reference signal pulse stream and said variable signal pulse stream, for ascertaining any phase delay between the occurrence of both a pulse in said reference signal pulse stream and a successive pulse in said variable signal pulse stream and, in response thereto, providing a signal indicative of the actual course.

11. The invention in claim 10 wherein said ascertaining and providing means is further comprised of:
means responsive to said timing pulse stream, said variable signal pulse stream and said reference signal pulse stream for counting the timing pulses occurring between the occurrence of a pulse in said variable signal pulse stream and a successive pulse in said reference signal pulse stream; and
means responsive to said count for producing a signal having a value indicative of the actual course.

12. The invention in claim 11 wherein the To/From signals producing means is comprised of:
means responsive to said OBS signal and said timing pulses for counting the number of timing pulses occurring between the successive pulses in said OBS signal;
means, responsive to at least one preselected value of the counted number, for generating an output associated therewith; and
means responsive to said output for producing said To/From signal.

13. In a very high frequency omni-range (VOR) receiver of the type wherein an increasing VOR signal is comprised of both a reference signal and a variable signal, circuitry for producing navigation information in response to said reference and variable signals comprising:
means for generating a stream of timing pulses which are in a substantially phase-locked relationship to a stream of pulses corresponding to said reference signal;
means for producing, in response to said timing pulse stream and to said reference signal pulse stream, a stream of OBS pulses which are phase-shifted by an amount representative of a preselected radial emittd by a predetermined VOR station; and
means, operative in response to said timing pulse stream, said OBS pulse stream and a stream of pulses corresponding to said variable signal, for determining any phase difference existing between said OBS pulse stream and said variable signal pulse stream and, in response thereto, producing a voltage indicative of course deviation between an actual course and said preselected radial;
wherein said circuitry is further comprised of:
means, responsive to said timing pulse stream, said reference signal pulse stream and said variable signal pulse stream, for ascertaining any phase delay between the occurrence of a pulse in said reference signal pulse stream and, in response thereto, providing a signal indicative of the actual course; and
means, responsive to said timing pulse stream, said OBS pulse stream and to said variable signal pulse stream for producing at least one To/From signal indicative of whether the actual course is in a direction towards or away from the predetermined VOR station.

14. In a very high frequency omni-range (VOR) receiver of the type wherein an incoming VOR signal is comprised of both a reference signal and a variable signal, circuitry for producing navigation information in response to said reference and variable signals comprising:
means for generating a stream of timing pulses which are in a substantially phase-locked relationship to a stream of pulses corresponding to said reference signal and are maintained at a frequency which is substantially a pre-set multiple of the frequency of said reference signal pulse stream,
means for providing digital information representative of a pre-selected radial,
means for counting said digital information to a predetermined value in response to said timing pulses and for producing a pulse of an OBS pulse stream whenever said count reaches said predetermined value,
means for initiating said counting at the occurrence of a pulse in said reference signal pulse stream,
means, operative in response to said timing pulse stream, said OBS pulse stream and a stream of pulses corresponding to said variable signal, for determining any phase difference existing between said OBS pulse stream and said variable signal pulse stream, and
means responsive to said phase difference for producing a voltage indicative of course deviation between an actual course and said pre-selected radial,
wherein said circuitry is further comprised of:
means, responsive to said timing pulse stream, said reference signal pulse stream and said variable signal pulse stream, for ascertaining any phase delay between the occurrence of both a pulse in said reference signal pulse stream and a successive pulse in said variable signal pulse stream and, in response thereto, producing signals indicative of the actual course, and
means, responsive to said timing pulse stream, said variable signal pulse stream and said reference signal pulse stream for counting the timing pulses occurring between the occurrence of a pulse in said variable signal pulse stream and a successive pulse in said reference signal pulse stream,
means, responsive to said count, for producing a signal having a value indicative of the actual course,
means, responsive to said timing pulse stream, said OBS pulse stream and to said variable signal pulse stream, for counting the number of timing pulses occurring between two successive pulses in said OBS signal,
means, responsive to at least one pre-selected value of the counted number for generating an output associated therewith, and
means, responsive to said output, for providing To/From signals indicative of whether the actual course is in a direction towards or away from this predetermined VOR station.

15. In a very high frequency omni-range (VOR) receiver of the type wherein an incoming VOR signal is comprised of both a reference signal and a variable signal, a method for producing navigation information in response to said reference and variable signals comprising the following steps:
generating a stream of timing pulses which are in a substantially phase-locked relationship to a stream of pulses corresponding to said reference signal;
producing, in response to said timing pulse stream and to said reference signal pulse stream, a stream of OBS pulses which are phase-shifted by an amount representative of a preselected radial emitted by a predetermined VOR station;

determining in response to said timing pulse stream, said OBS pulse stream and a stream of pulses corresponding to said variable signal, any phase difference existing between said OBS pulse stream and said variable signal pulse stream; and producing, in response to said phase difference, a voltage indicative of course deviation between an actual course and said preselected radial.

16. The method of claim 15 further comprising the steps of:

producing, in response to said timing pulse stream, said OBS pulse stream and to said variable signal pulse stream, at least one To/From signal indicative of whether the actual course is in a direction towards or away from the predetermined VOR station.

17. The method of claim 16 further comprising the steps of:

ascertaining, in response to said timing pulse stream, said reference signal pulse stream and said variable signal pulse stream, any phase delay between the occurrence of both a pulse in said reference signal pulse stream and a successive pulse in said variable signal pulse stream and, in response thereto, providing a signal indicative of the actual course.

18. The method of claim 17 wherein said generating step is comprised of the step of:

maintaining, in response to said timing pulses and said reference signal pulse stream, the frequency of said timing pulse stream substantially at a pre-set multiple of the frequency of said reference signal pulse stream.

* * * * *